July 26, 1955 B. A. BERGER 2,714,012
FOLDING GOLF CART
Filed Sept. 4, 1953
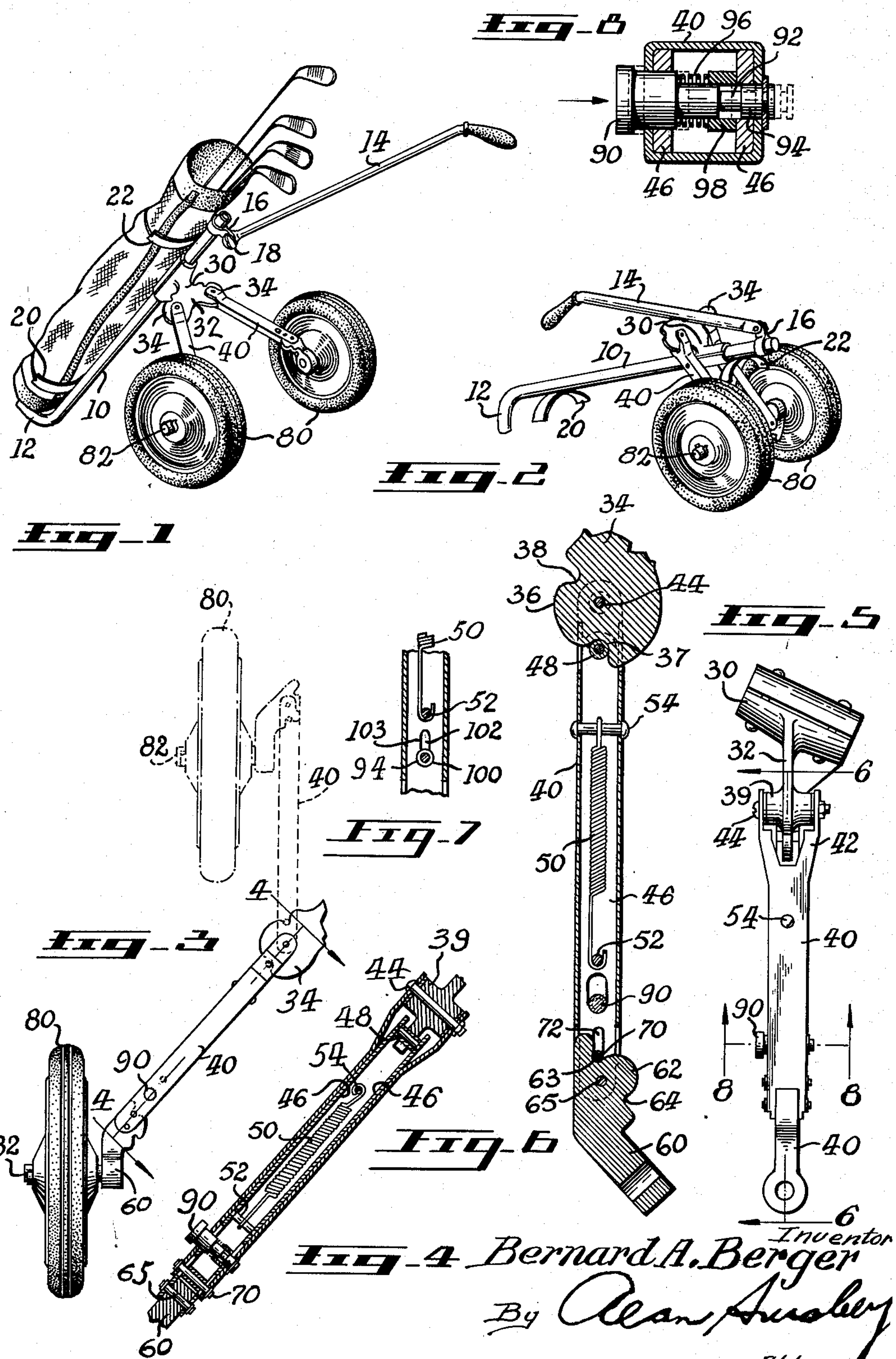

United States Patent Office 2,714,012

Patented July 26, 1955

1

2,714,012

FOLDING GOLF CART

Bernard A. Berger, Westmount, Quebec, Canada

Application September 4, 1953, Serial No. 378,601

7 Claims. (Cl. 280—40)

The present invention relates to vehicles or carts for the transportation of golf clubs and more particularly to vehicles of this nature wherein there is means provided for the collapsing or folding up of the wheels relative to the main supporting member.

While there are many and varied types of golf carts available having the folding feature referred to, the majority of these embody complicated structures to permit the folding feature. In these prior art constructions, it is common to have complicated arrangements of folding links, levers, and brackets which in many cases make the structure cumbersome and moreover, costly from the point of view of manufacture and to the potential purchaser.

The present invention aims to provide a golf cart structure wherein the means whereby the wheels are folded have been reduced to the minimum of parts while providing a sturdy and rigid structure.

It is a main object of the present invention to provide a foldable golf cart construction wherein the main working elements are housed within the legs supporting the wheels without the necessity of additional struts or braces.

A further object of the present invention is to provide a folding golf cart construction wherein guiding cam means are provided to guide resiliently biased detent members into retaining position when the supporting legs and wheels are fully extended or retracted into folded or unfolded condition.

A still further object of the present invention is to provide a folding golf cart construction wherein manually operated locking means are provided whereby the supporting legs and wheels cannot be folded or unfolded until said locking means has been released.

Having thus generally described the nature of the invention, particular reference will be made to the accompanying drawings where there is shown by way of illustration, a preferred embodiment thereof, and in which:

Figure 1 is a view in perspective elevation of a folding golf cart constructed in accordance with the invention.

Figure 2 is a view of the golf cart shown in Figure 1 with the supporting wheels folded up into storage or carrying position with the controlling handle also folded in storage position.

Figure 3 is a diagrammatic view of one leg of the supporting bracket and one supporting leg, wheel supporting member and wheel to illustrate the relative position in the operating or unfolded condition with the folded position being shown in broken lines.

Figure 4 is a cross sectional view of the folding leg as shown in Figure 3, in section along the line 4—4 of Figure 3.

Figure 5 is a view in side elevation of the main supporting bracket, one supporting leg, and the corresponding groove supporting member with the wheel removed for clarity.

Figure 6 is a cross sectional view of the structure shown in Figure 5 along the line 6—6 to show the internal construction more clearly, particularly the relation of the detents with the cam surfaces of the supporting bracket and the wheel supporting member.

Figure 7 is a partial fragmentary view of the lower portion of the outer and inner supporting leg members to illustrate the opposite side of the supporting leg accommodation to show the key hole slot in the inner member which is adapted to co-operate with the locking pin.

Figure 8 is an enlarged detail view, in section, of the manually operable locking pin as it would appear along the line 8—8 of Figure 5.

With particular reference to Figures 1 and 2, the preferred construction of a folding cart in accordance with the invention includes the combination of a main supporting member 10 which is preferably an elongated section of tubular material with the lower end formed in a curvate shape as indicated at 12. The upper end of the main supporting member 10 is connected to a controlling handle 14 by means of a bracket 16 which includes a pivot 18 so that the handle 14 can be folded relative to the main supporting member 10. There are also provided arcuate members 20, 22 which are secured directly to the main supporting body 10 and provided with suitable straps for the retaining of a golf bag in alignment with the body 10.

In accordance with the present invention, a bracket 30 is mounted on and is secured to the main body 10 adjacent the upper end, as shown in Figure 1. The bracket 30 is provided with a flange or extension 32 which extends diagonally from the main body of the bracket and provides two spaced apart corresponding leg supporting plates 34. The marginal edges of the ends of the plates 34 are each formed to provide cam surfaces 36 having detent recesses 37, 38. The plates 34 are also provided with outstanding bosses 39 at each side which are provided with central openings and serve as the pivotal axes for the wheel supporting legs.

The wheel supporting legs in the present construction are each made up of two telescopically interconnected members. These comprise of an outer leg member 40 made up of square tubing having one end enlarged and cut out to provide a bifurcate shape 42 with side plates which fit over the outstanding bosses 39 of the supporting plate to which they are connected by suitable nuts and bolts 44. The inner member of the leg structure comprises of a pair of spaced apart plates 46 which are connected at each end by suitable rivets and spacers. The combined plates 46 are slidably mounted within the interior of the outer member 40, as is shown in Figures 4 and 6.

The inner plates 46 making up the inner member are provided at one end with a detent roller 48 which is mounted over the rivet spacing the two plates apart. The detent 48, when the leg is pivotally mounted to the support bracket, is adapted to travel over the cam surface 36 and in certain positions be engaged in the detent recesses 37, 38. The inner member is normally resiliently biased to keep the detent 48 in engagement with the cam surface 36 by means of a resilient coil spring 50 extending between a rivet 52 passing through the plates 46 and a further rivet 54 extending across the outer member 40 between the plates 46.

At the lower ends of each supporting leg there is mounted a wheel supporting member or fitting 60. Each of the fittings 60 include a cam surface 62 having detent recesses 63, 64. Each fitting 60 is pivotally mounted to the lower end of the inner leg member by means of a suitable bolt or rivet 65 passing through the plates 46. A detent member 70 is mounted for rotation in the leg member 40 so as to be engaged with the cam surfaces 62 and the detent recesses 63, 64 as will be described in more detail later. The inner plates 46 each include an elongated slot 72 to provide clearance for the movement of the plates over the detent pin 70 during the action. A pair of wheels 80 are mounted in the fittings 60 by suitable axles or shafts 82 for free rotation relative to the fittings.

While the detent members 70 on the lower end of the supporting leg outer members 40 and the detent rollers 48 on the upper end of the plates 46 of the supporting leg are normally maintained in resilient contact with the detent recesses of the respective cam surfaces through the action of the coil spring 50, there is also provided a locking pin 90 on each of the leg assemblies so that the folding action cannot take place unless the locking pins are released.

With particular reference to Figure 8, the locking pin arrangement utilized in the present construction comprises of the manually operable pin 90 having a first and second stepped portion, 92, 94 of different diameters. The pins 90 are each mounted for restricted sliding movement, transversely through the outer leg members 40 and the inner leg supporting plates 46.

As is shown in Figure 8, the retaining pins 90 are each normally resiliently biased through the medium of a coil spring 96 and a spacer 98 so that the lower and larger portion 94 of the pin is in alignment with the larger portion 100 of a key hole recess or slot 102 provided in one of the plates 46. As will be appreciated, when the portion 94 is in alignment or register with the portion 100 of the slot 102, the plates 46 are locked firmly against sliding movement relative to the outer member 40. Upon depression of the pin 90 against the spring 96, the second and narrower pin portion 92 is brought into register with a correspondingly narrower portion 103 of the slot 102 so that the plates 46 can move slidably relatively to the outer leg member 40.

With this arrangement, when it is desired to fold the wheels 80 and the legs 40 into storage or carrying position, as shown in Figure 3 in dotted lines, the pin 90 is depressed and by pulling upwards on the supporting leg 40 the detent members 70 and 48 are free to ride around the cam surfaces 36, 62, until they come into engagement with the respective detent recesses 38, and 64. Due to the position of the wheels 80 relative to the wheel supporting members 60 the location of the centre of gravity of the wheels 80 causes the supporting members to fold downwards relative to the supporting legs 40 as the cam member 70 rides along the cam surface 62. During the reverse, or unfolding movement the final pivoting of the wheel supporting members 60 interlocked position requires a slight push against the wheels 80. In this condition the supporting leg inner plates 46 are again in the same relative position as they were in the first operating condition so that the pins 90, through the action of the springs 96, are once again extended from the surface of the outer leg members 40 bringing the larger portions 94 into engagement with the slot portions 100 so as to lock the supporting legs in the upright folded position. As will be appreciated, reversal of this action, that is, depression of the pins 90, and lowering of the supporting legs 40 reverse the procedure so that the detent members 70, 48 are again brought into register with the cam surface recesses 37, 63 and are locked in that position as before.

The present construction wherein the main working elements are housed within the supporting legs proper without the necessity of additional struts or levers, gives the resultant structure a clean and uncomplicated appearance. The provision of the present quick-acting and positive cam and detent mechanism provides a simple and sturdy means of retaining the supporting legs in their extended or folded position. The individual manually operable locking pins on each leg eliminates the possibility of the operator's fingers being caught in the folding mechanism while it is being operated and also allows the folding and unfolding operation to be performed easily and quickly by a single person, which is not always possible with many of the prior art structures of this nature. When folded, the present golf cart construction occupies the minimum of space, which is important for carrying or storage purposes and when extended gives a rigid balanced, and easily maneuverable wheeled support to the golf bag.

I claim:

1. A foldable golf cart comprising in combination, a main elongated supporting member, leg supporting plates extending from said member, a pair of supporting legs each including an outer member and an inner member slidably mounted within said outer member, said outer members being pivotally connected to said leg supporting plates and said inner members each being pivotally connected to one of a pair of wheel supporting members, a pair of wheels mounted for rotation on said wheel supporting members, said leg supporting plates and wheel supporting members being provided with cam surfaces including detent recesses, detent means within each of said supporting legs inner and outer members adjacent each end adapted to engage with said respective cam surface recesses, and control means for releasing said supporting leg detent means.

2. A foldable golf cart as claimed in claim 1, wherein said inner leg members are resiliently biased relative to said leg outer members in the direction of said leg supporting plates.

3. A foldable golf cart comprising in combination, a main tubular supporting member, leg supporting plates extending from said member, a pair of supporting legs, each of said supporting legs being in two slidably connected portions with one of said portions being pivotally connected to said supporting plate with the other of said portions being pivotally connected to one of a pair of wheel supporting members, a pair of wheels mounted for rotation on said wheel supporting members, said leg supporting plates and wheel supporting members being each provided with cam surfaces including detent recesses, detent means within each of said supporting legs adjacent each end adapted to engage with said respective cam surface recesses, and control means for releasing said supporting leg detent means.

4. A foldable golf cart as claimed in claim 3 wherein said supporting leg portions pivotally connected to said wheel supporting members are resiliently biased towards said leg supporting plates and each include a detent pin adjacent the end remote from said pivotal connection engageable with said leg supporting plate cam recess.

5. In a foldable golf cart having collapsible legs extending between a main tubular member having leg supporting plates provided with cam surfaces having locking recesses and a pair of wheel supporting members also provided with cam surfaces having locking recesses; a supporting leg construction comprising, a hollow tubular outer member adapted for pivotal connection at the one end to said main tubular member's leg supporting plates and an inner member slidably and telescopically mounted within said outer member and being adapted for pivotal connection to said wheel supporting members, a resilient coil spring acting between said inner and outer leg members adapted to urge said inner member inwardly with respect to said outer member, detent means mounted on said inner member adapted to engage within said leg supporting plate cam recesses, detent means mounted on said outer member adapted to engage said wheel supporting members cam recesses, and manually operable locking means between said inner and outer members whereby said inner member can be locked with respect to said outer member and released with respect to said outer member so as to come under the influence of said resilient spring.

6. A foldable golf cart as claimed in claim 5 wherein one end of said main tubular member is formed into a curvate shape and there are spaced apart arcuate strap supporting members secured to said tubular supporting member adjacent to said curvate end and adjacent the other end of said member.

7. In a foldable golf cart as claimed in claim 5 wherein said locking means between said inner and outer members comprise a key hole slot in each of said inner members and a graduated pin mounted for resiliently biased sliding movement through both of said members, said pin having a first portion fitting the larger opening of said key hole slot and a second portion of lesser diameter fitting the narrower portion of said key hole slot and being normally resiliently biased so as to register said pin larger portion with the larger opening of said slot whereby depression of said pin through said members brings said second pin portion into alignment with said second slot portion permitting sliding movement of said inner member with respect to said outer member.

References Cited in the file of this patent

UNITED STATES PATENTS

| | | |
|---|---|---|
| 2,598,046 | Frey | May 27, 1952 |
| 2,599,354 | Stableford | June 3, 1952 |